United States Patent [19]
Klug

[11] Patent Number: 6,119,940
[45] Date of Patent: Sep. 19, 2000

[54] IDENTIFICATION METHODS

[75] Inventor: Philip D. Klug, Westland, Mich.

[73] Assignee: Unisys Corporation, Blue Bell, Pa.

[21] Appl. No.: 09/040,191

[22] Filed: Feb. 12, 1998

Related U.S. Application Data

[60] Provisional application No. 60/038,099, Feb. 18, 1997.

[51] Int. Cl.[7] .................................................... G06K 7/10
[52] U.S. Cl. ...................................... 235/462.04; 235/469
[58] Field of Search .............................. 235/487, 462.04, 235/469

[56] References Cited

U.S. PATENT DOCUMENTS

| | | | |
|---|---|---|---|
| 4,687,526 | 8/1987 | Wilfert | 156/64 |
| 4,972,476 | 11/1990 | Nathans | 380/23 |

*Primary Examiner*—Harold I. Pitts
*Attorney, Agent, or Firm*—Rocco L. Adornato; Mark T. Starr; Steven B. Samuels

[57] ABSTRACT

A card reader method for color cells. Calibration and indicia cells are provided.

15 Claims, 25 Drawing Sheets

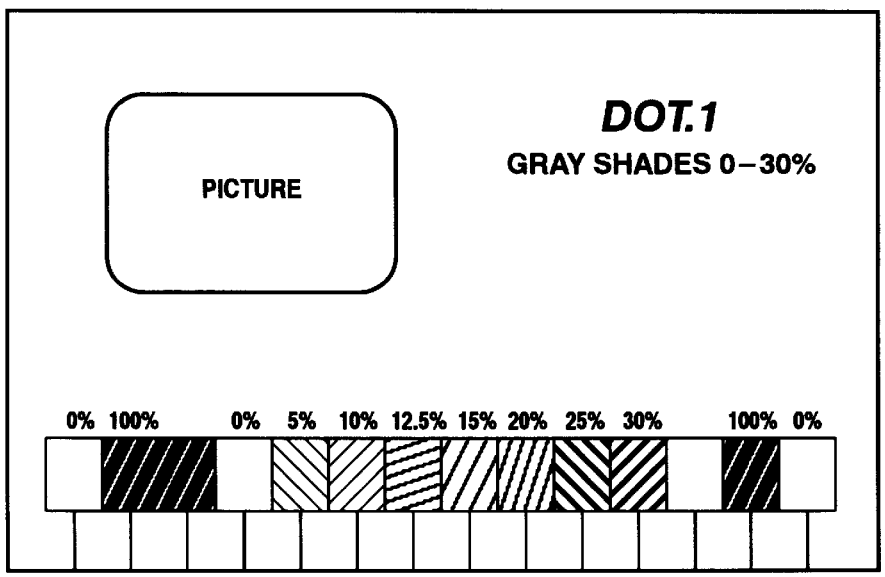
Figure A1
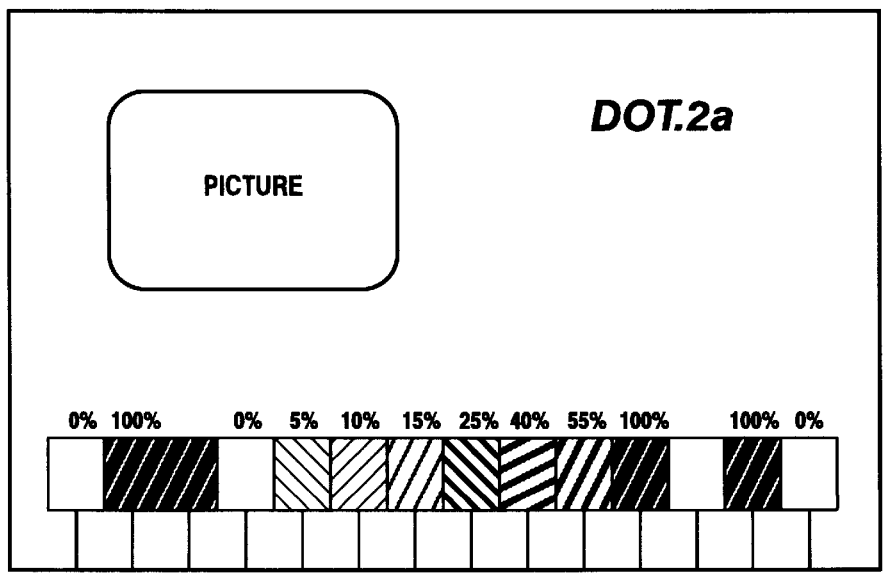
Figure A2

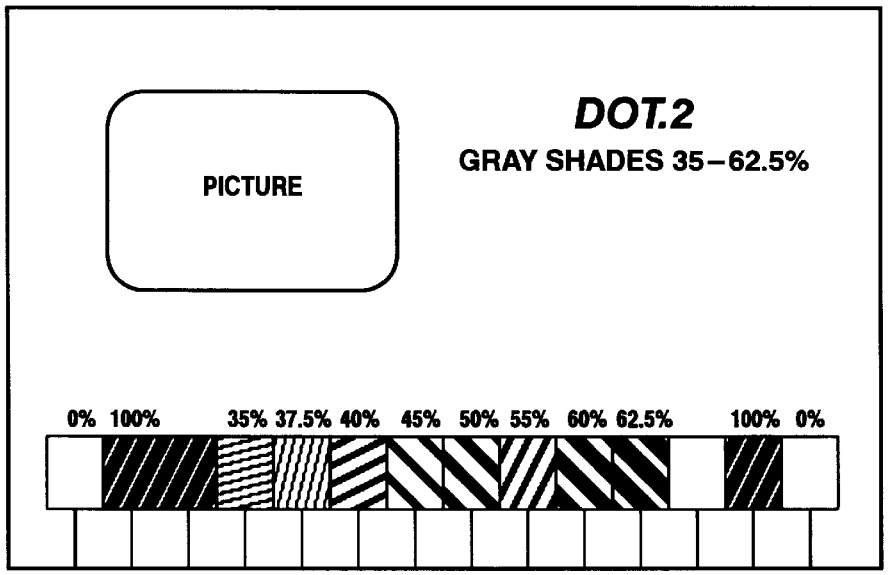
Figure A3
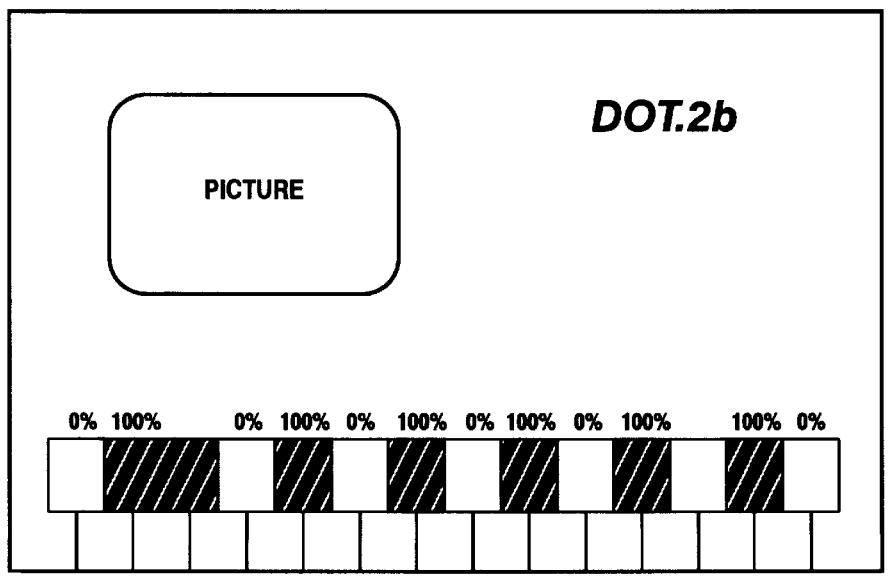
Figure A4

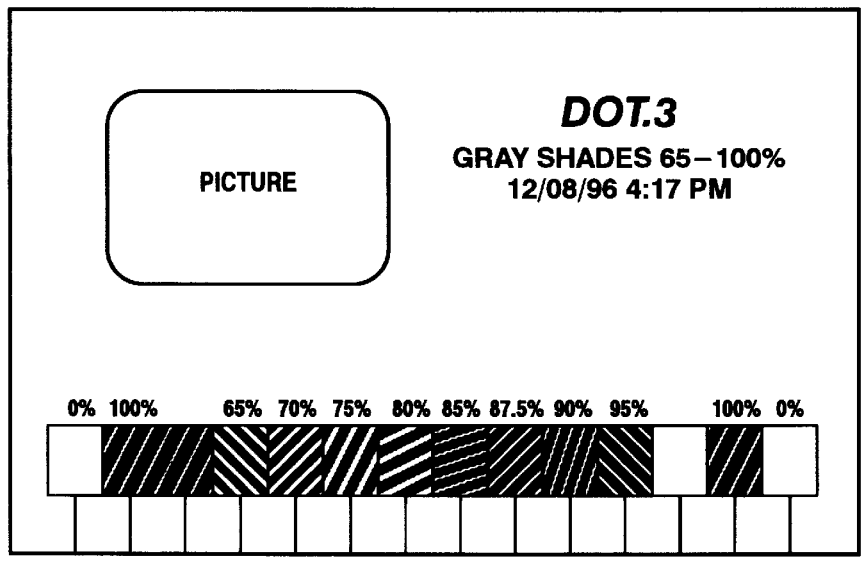
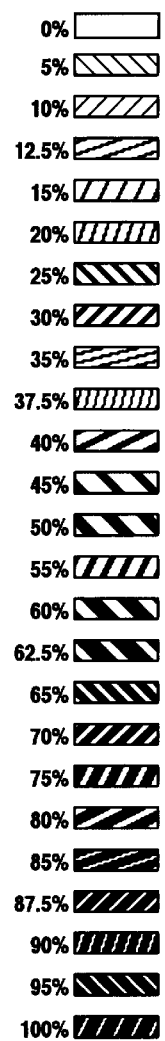
Figure A5

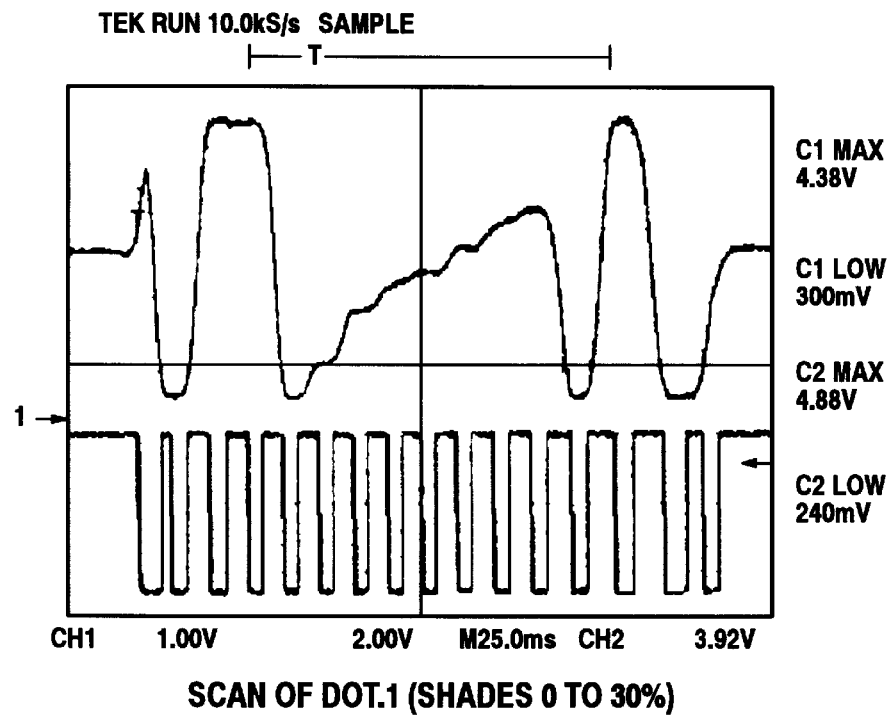
*Figure B1*
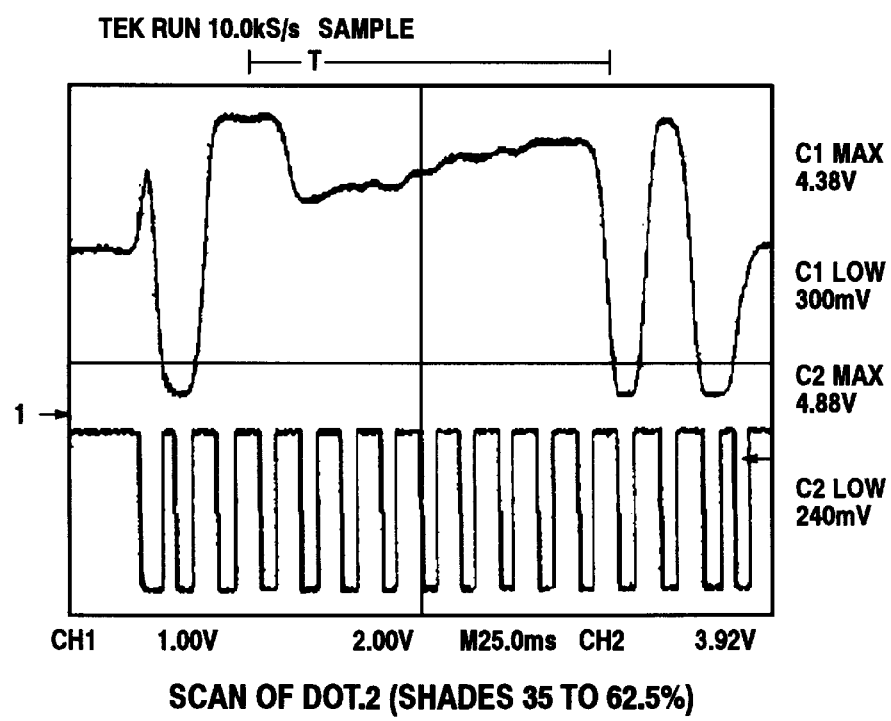
*Figure B2*

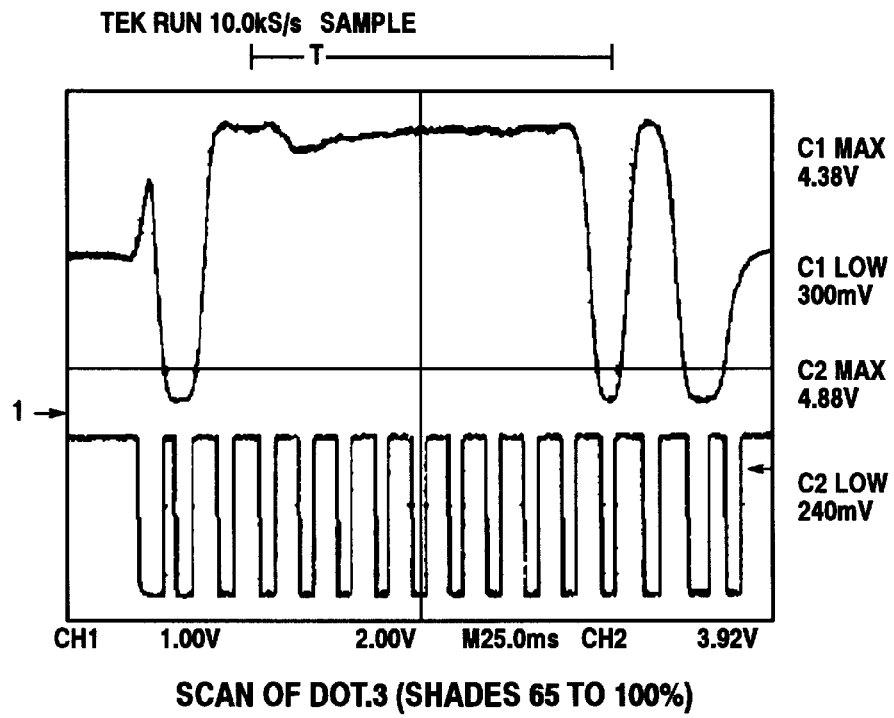
*Figure B3*
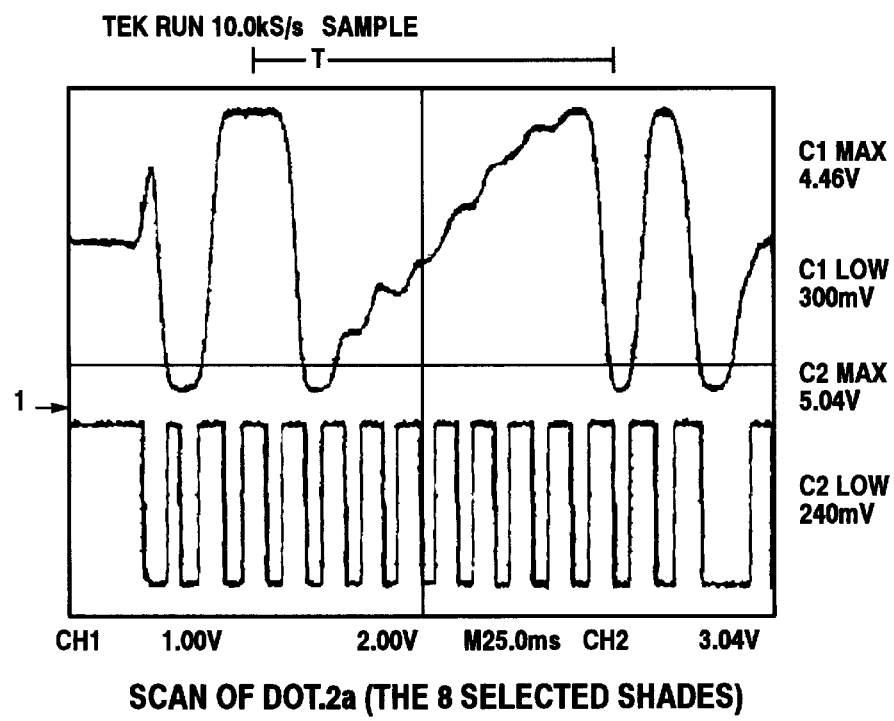
*Figure B4*

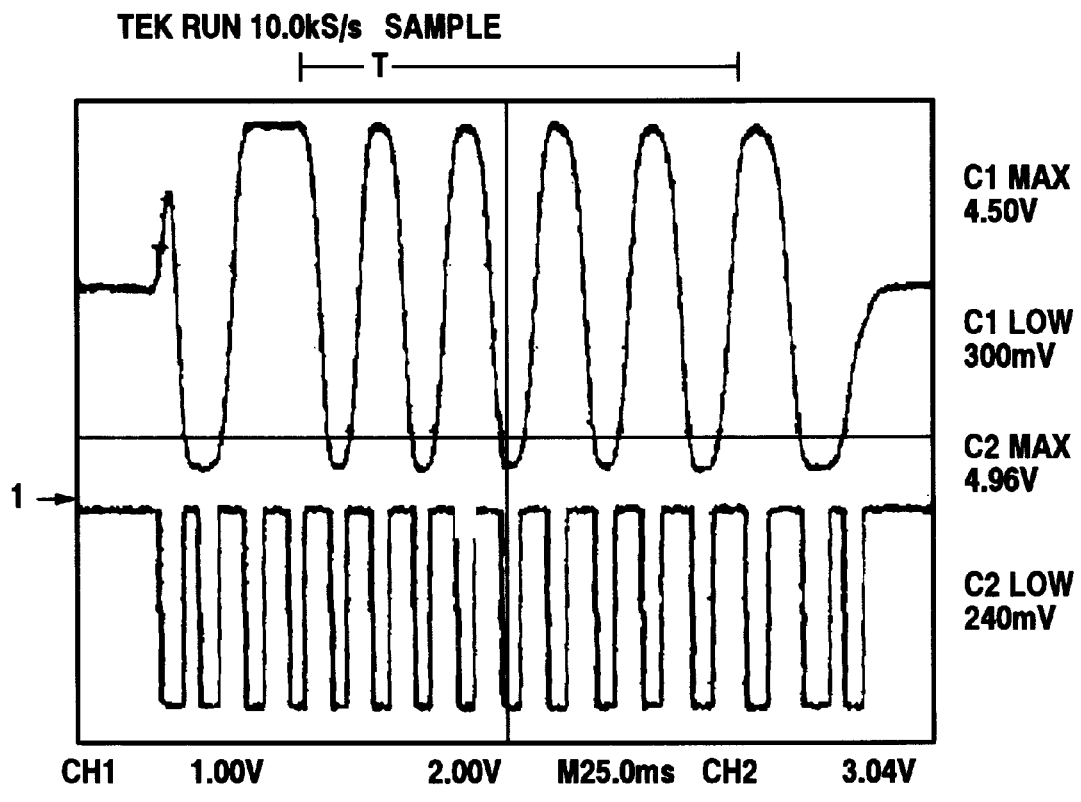
Figure B5

| PARTS LIST / BILL OF MATERIALS | | | | |
|---|---|---|---|---|
| PART NUMBER OR VALUE | DESCRIPTION | MANUFACTURER | QTY | PRICE |
| 10-PIN HEADER | 10-PIN HEADER | ANY | 1 | $0.00 |
| 10-PIN SOCKET | 10-PIN SOCKET | ANY | 1 | $0.00 |
| 1N4004 | DIODE | ANY | 1 | $0.00 |
| 24N2.4 | POWER SUPPLY | ACDC ELECTRONICS | 1 | $0.00 |
| 2716 | PROM | ANY | 2 | $0.00 |
| 555 TIMER | TIMER | ANY | 1 | $0.00 |
| 6116 | RAM | ANY | 2 | $0.00 |
| 68010 | 10MHz MICROPROCESSOR | MOTOROLA | 1 | $0.00 |
| 6850 | ACIA | MOTOROLA | 1 | $0.00 |
| 74LS04 | HEX INVERTER | ANY | 1 | $0.00 |
| 74LS07 | HEX BUFFER / DRIVER | ANY | 1 | $0.00 |
| 74LS08 | QUAD 2-INPUT AND | ANY | 1 | $0.00 |
| 74LS123 | DUAL RETRIGGERABLE ONE-SHOT | ANY | 1 | $0.00 |
| 74IS125 | QUAD TRI-STATE BUFFER | ANY | 2 | $0.00 |
| 74LS138 | 3 TO 8 LINE DECODER | ANY | 1 | $0.00 |
| 74LS245 | OCTAL TRI-STATE TRANSCEIVER | ANY | 2 | $0.00 |
| 74LS393 | DUAL 4-BIT BINARY COUNTER | ANY | 1 | $0.00 |
| 74LS74 | POSITIVE EDGE D FLIP-FLOP | ANY | 1 | $0.00 |
| 8" 10-LEAD RIBBON CABLE | 8" 10-LEAD RIBBON CABLE | ANY | 1 | $0.00 |
| 9-PIN D-CONNECTOR | 9-PIN D-CONNECTOR | ANY | 1 | $0.00 |
| AA | ALKALINE BATTERIES | ANY | 2 | $1.99 |
| ADC0841 | 8-BIT ANALOG TO DIGITAL | NATIONAL SEMICONDUCTOR | 1 | $0.00 |
| BATTERY HOLDER | BATTERY HOLDER | ANY | 1 | $0.00 |
| CAPACITOR 0.01uF | CAPACITOR | ANY | 1 | $0.00 |
| CAPACITOR 0.1uF | CAPACITOR | ANY | 2 | $0.00 |
| CAPACITOR 0.22uF | CAPACITOR | ANY | 1 | $0.00 |
| CAPACITOR 0.47uF | CAPACITOR | ANY | 1 | $0.00 |
| CAPACITOR 1000pF | CAPACITOR | ANY | 1 | $0.00 |
| CAPACITOR 1000uF | CAPACITOR | ANY | 2 | $0.00 |
| CAPACITOR 10uF | CAPACITOR | ANY | 2 | $0.00 |
| CAPACITOR 1uF | CAPACITOR | ANY | 2 | $0.00 |
| CAPACITOR 2200pF | CAPACITOR | ANY | 7 | $0.00 |
| CAPACITOR 220uF | CAPACITOR | ANY | 3 | $0.00 |
| DAC0832 | 8-BIT DIGITAL TO ANALOG | NATIONAL SEMICONDUCTOR | 2 | $0.00 |
| EA-D 16025 PR-1 | 2X16 BACKLIT LCD DISPLAY | EPSON | 1 | $0.00 |
| ENCLOSURE | ENCLOSURE | ANY | 1 | $0.00 |
| FUSE 1.5A | FAST BLOW FUSE 1.5A | ANY | 1 | $0.00 |
| INDUCTOR 100uH | INDUCTOR | ANY | 1 | $0.00 |

*Figure 14*

| PARTS LIST / BILL OF MATERIALS | | | | |
|---|---|---|---|---|
| PART NUMBER OR VALUE | DESCRIPTION | MANUFACTURER | QTY | PRICE |
| INDUCTOR 22uH | INDUCTOR | ANY | 1 | $0.00 |
| INDUCTOR 300uH | INDUCTOR | ANY | 1 | $0.00 |
| LINE CORD | LINE CORD | ANY | 1 | $0.00 |
| LINE CORD SOCKET | LINE CORD SOCKET | ANY | 1 | $0.00 |
| LM2574-12 | 12V DC-DC CONVERTER | NATIONAL SEMICONDUCTOR | 1 | $0.00 |
| LM2574-5 | 5V DC-DC CONVERTER | NATIONAL SEMICONDUCTOR | 1 | $0.00 |
| LM339 | CAMPARITOR | ANY | 1 | $0.00 |
| LM358 | OPERATIONAL AMPLIFIER | ANY | 1 | $0.00 |
| MAX232ACPE | TTL TO RS232 DEVICE | MAXIM | 1 | $0.00 |
| MXD1210 | STATIC TO NVRAM DEVICE | MAXIM | 1 | $0.00 |
| OPB 704 | REFLECTIVE SENSOR | OPTEK | 2 | $0.00 |
| OSCILLATOR 1.2288 MHz | OSCILLATOR | ANY | 1 | $0.00 |
| OSCILLATOR 4 MHz | OSCILLATOR | ANY | 1 | $0.00 |
| PAL22V10 | PROGRAMMABLE ARRAY LOGIC | ANY | 1 | $0.00 |
| POTENTIOMETER 10K 1/4W | POTENTIOMETER | ANY | 1 | $0.00 |
| POTENTIOMETER 1K 1/2W | POTENTIOMETER | ANY | 1 | $0.00 |
| RESISTOR 10K | RESISTOR | ANY | 5 | $0.00 |
| RESISTOR 150 | RESISTOR | ANY | 1 | $0.00 |
| RESISTOR 16.1K | RESISTOR | ANY | 2 | $0.00 |
| RESISTOR 1K | RESISTOR | ANY | 1 | $0.00 |
| RESISTOR 1M | RESISTOR | ANY | 2 | $0.00 |
| RESISTOR 2.2K | RESISTOR | ANY | 2 | $0.00 |
| RESISTOR 2.6 | RESISTOR 3W | ANY | 1 | $0.00 |
| RESISTOR 2.65K | RESISTOR | ANY | 1 | $0.00 |
| RESISTOR 30K | RESISTOR | ANY | 2 | $0.00 |
| RESISTOR 47.5K | RESISTOR | ANY | 1 | $0.00 |
| RESISTOR 540K | RESISTOR | ANY | 1 | $0.00 |
| RESISTOR 562K | RESISTOR | ANY | 1 | $0.00 |
| RESISTOR 8.2 | RESISTOR 2W | ANY | 1 | $0.00 |
| RESISTOR 86.7 | RESISTOR | ANY | 2 | $0.00 |
| RESISTOR PAK 10K | RESISTOR PAK | ANY | 1 | $0.00 |
| RESISTOR PAK 4.7K | RESISTOR PAK | ANY | 1 | $0.00 |
| SOLENOID | 24VDC SOLENOID | ANY | 1 | $0.00 |
| SW-1 | SWITCH NO W / LED | ANY | 1 | $0.00 |
| SW-2 | ROCKER SWITCH WITH LIGHT | ANY | 1 | $0.00 |
| TIP 120 | DARLINGTON TRANSISTOR | ANY | 1 | $0.00 |
| ZENER 12V | 12V ZENER DIODE | ANY | 1 | $0.00 |
| ZENER 3.3V | 3.3V ZENER DIODE | ANY | 1 | $0.00 |
| ZENER 5V | 5V ZENER DIODE | ANY | 2 | $0.00 |
| TOTAL OUT OF POCKET EXPENSES | | | | $1.99 |

*Figure 15*

IDENTIFICATION METHODS

This is a Continuation of my U.S. Provisional Application, Ser. No. 60/038,099, filed Feb. 18, 1997, and claims priority therefrom.

This relates to "identity cards", especially those characterized by "gray-shade" bits, and to methods of using shuch.

BACKGROUND, FEATURES

Many current pass card (e.g. identification) systems use a magnetic strip on a card to store coded information. While this method can store many bytes of data, it is prone to data corruption if the card is placed in a strong magnetic field. Over time, the magnetic strip loses its ability to store information, making it necessary to replace the card. Other pass card systems use bar-codes to represent coded information. Bar-codes are unique combinations of like white and black areas that represent coded information. Bar-codes cannot be corrupted other than by physical destruction of the card or the bar-code itself. While information coded as a bar-code can be thought of as fairly permanent, not much data can be stored in a given area.

In response to this, I developed, and herewith describe, a novel "Gray Shade Pass Card Reader" as a new kind of pass card that offers the durability of a bar-code system, yet can store much more information in a given area. A complete system is proposed defining this new pass card and the electronics used to retrieve and process the information encoded thereon.

Objectives

A. To define a new technique for storing small amounts of data on a pass card using of gray areas of various shades, each shade to represent a particular information bit.

B. To define the electronic hardware necessary to successfully retrieve the information from such a gray shade pass card and prepare it for processing by a computer.

C. To describe a working system that uses microcontroller technology to process the code from the pass card, to determine if the code is valid and then allow access to a restricted area.

Workers will note below that

1. The format of such pass cards has been defined Specific gray shades have been selected to represent the numbers 0 through 7. The pass cards also have calibration areas, plus clock marks, plus an area for determining the direction of the card as it is swiped through a read head.

2. The read head is described along with the electronics that convert each gray shade area to digital data.

3. Also proposed is a microcontroller using the Motorola 68010 microprocessor, and including PROM containing a simple monitor program, plus RAM and a serial interface to a terminal.

4. A schematic defining the electronics; and

5. An outline of the code used by the microcontroller to process the information on the pass card.

Thus, it is an object hereof to address (at least some of) the aforementioned problems, and to provide the hereincited advantages and functions. A related object is to provide a gray shade pass card system.

The methods and means discussed herein, will generally be understood as constructed and operating as presently known in the art, except where otherwise specified; with all materials, methods and devices and apparatus herein understood as implemented by known expedients according to present good practice.

BRIEF DESCRIPTION OF THE DRAWINGS

These and other features of advantage of the present invention will be appreciated by workers as they become better understood by reference to the following detailed descriptions of past and present preferred embodiments which should be considered in conjunction with the accompanying drawings, wherein like reference symbols denote like elements.

Figure 3:
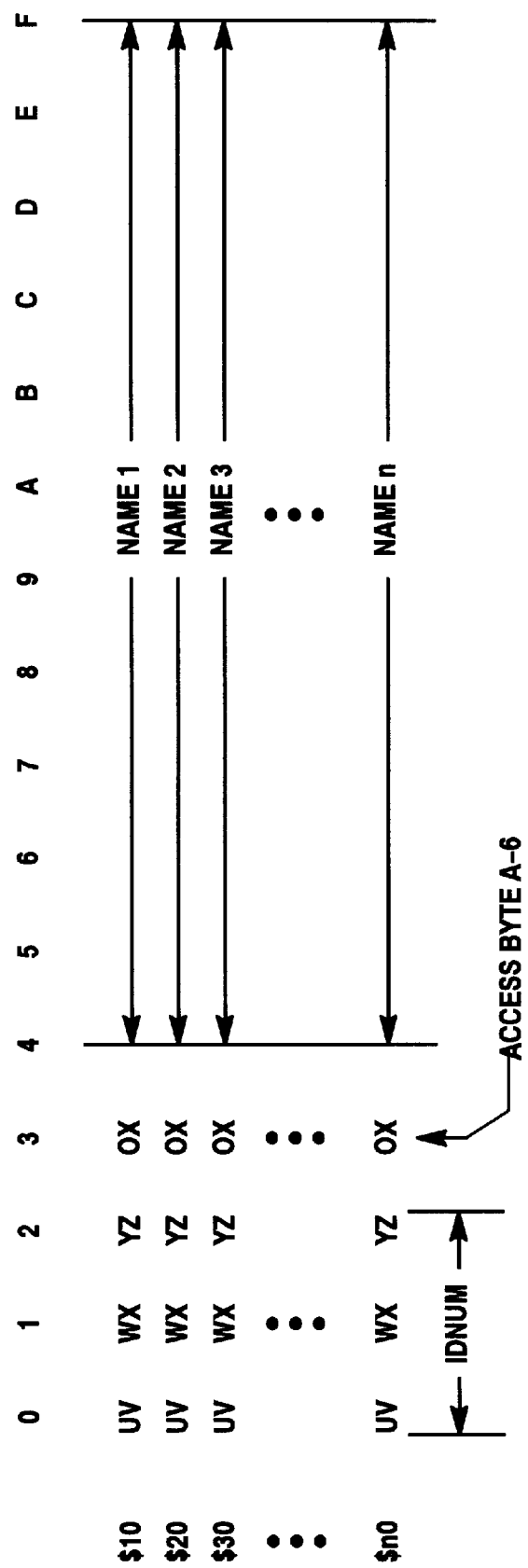
Figure 4:
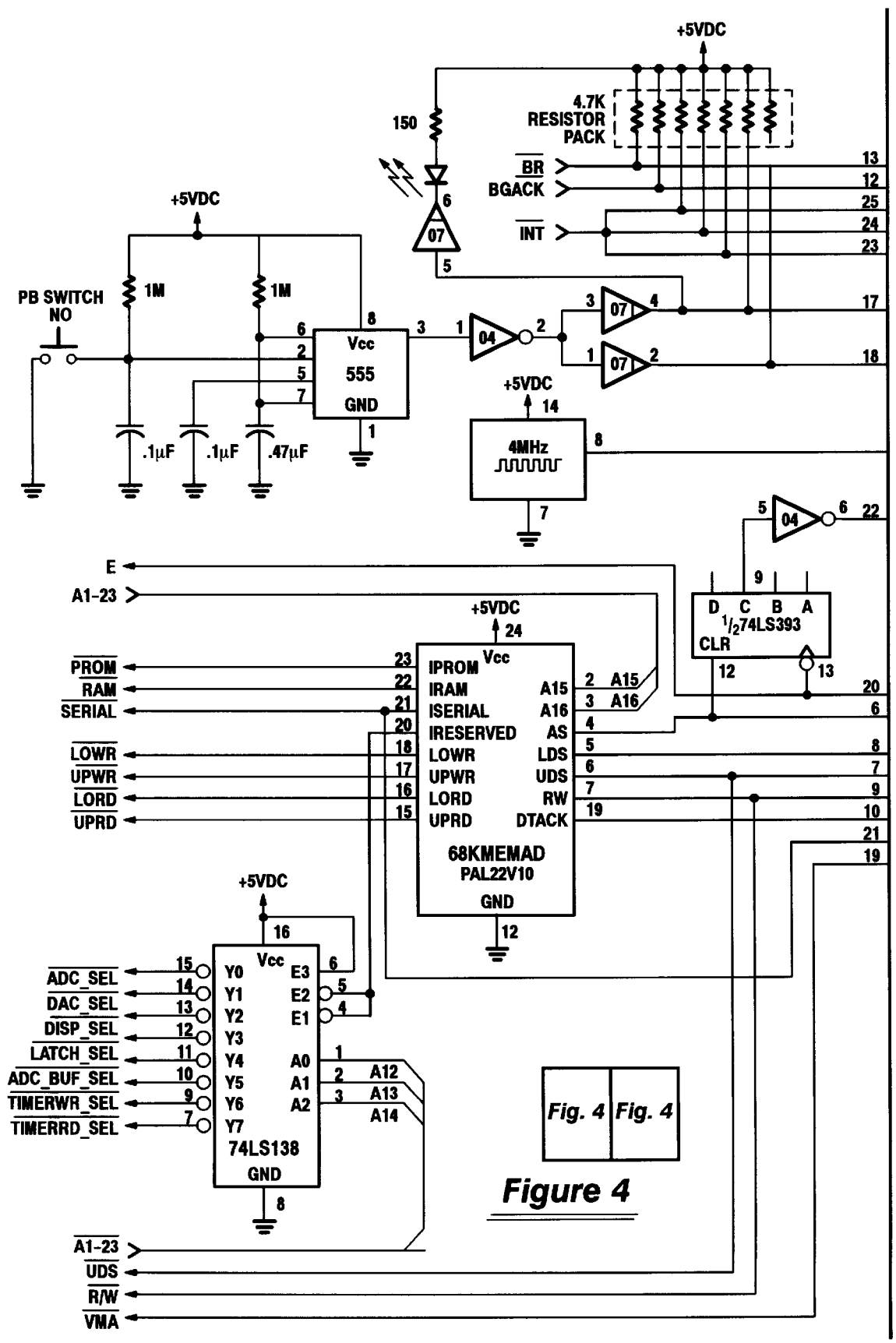
Figure 4:
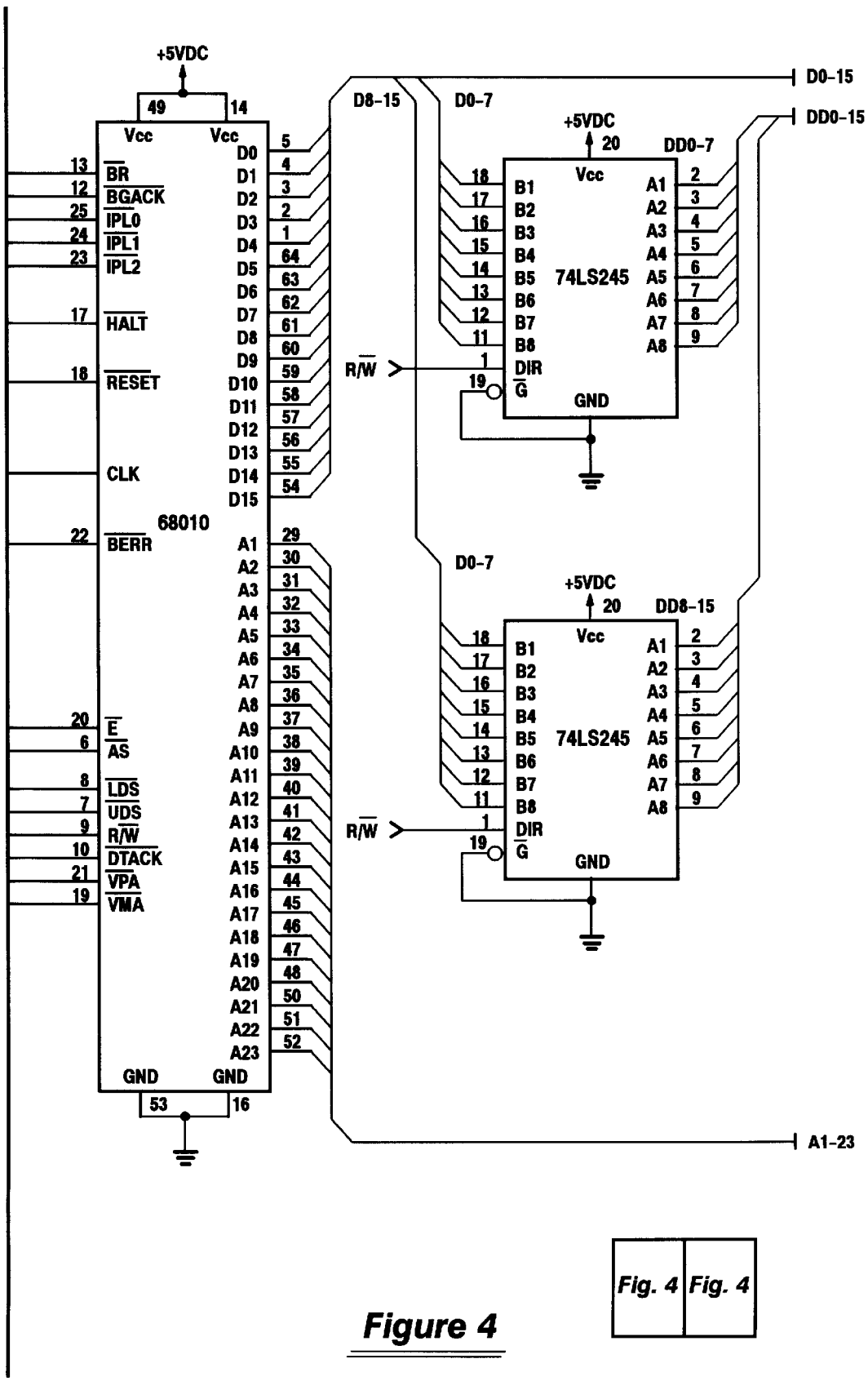
Figure 5:
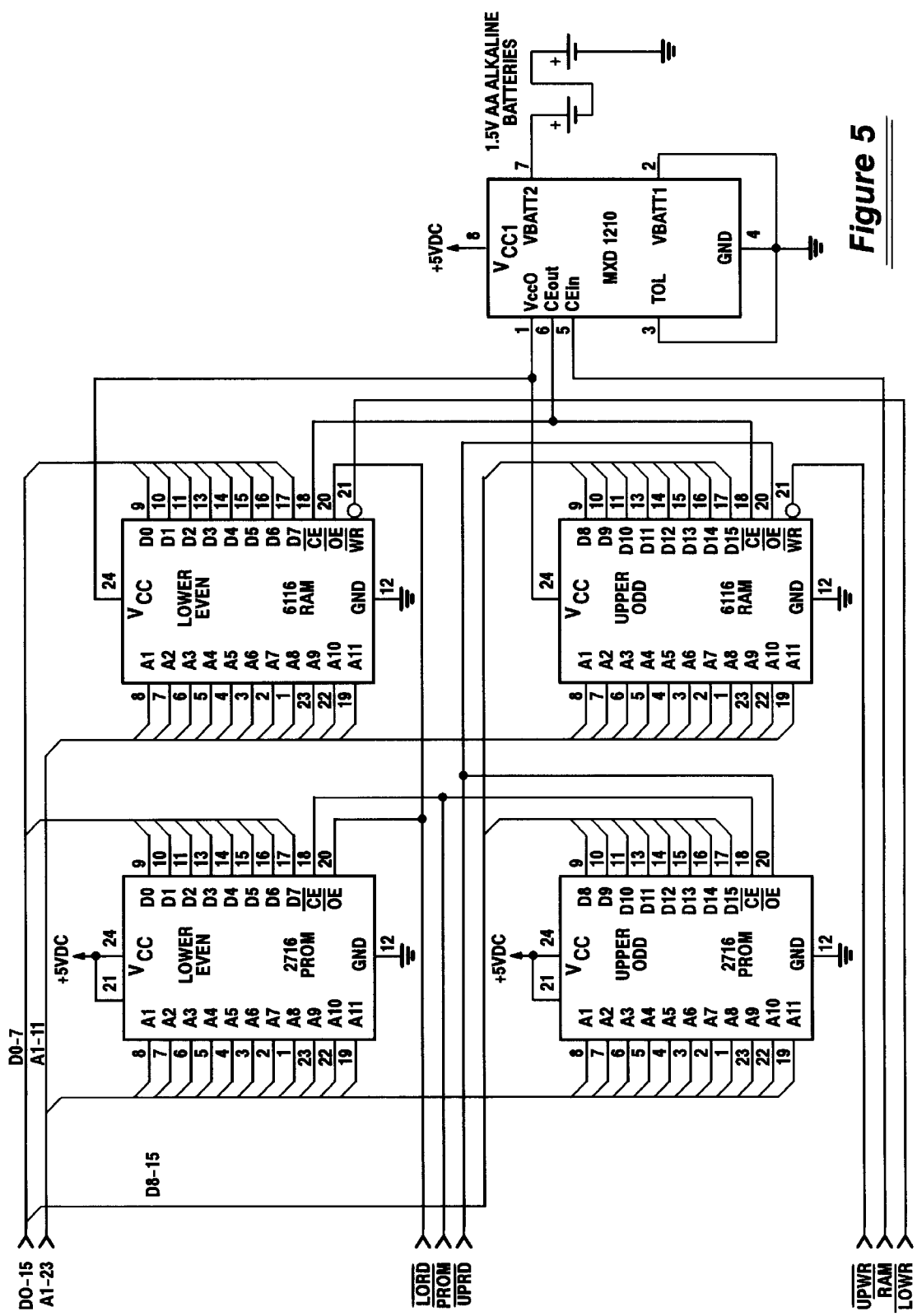
Figure 6:
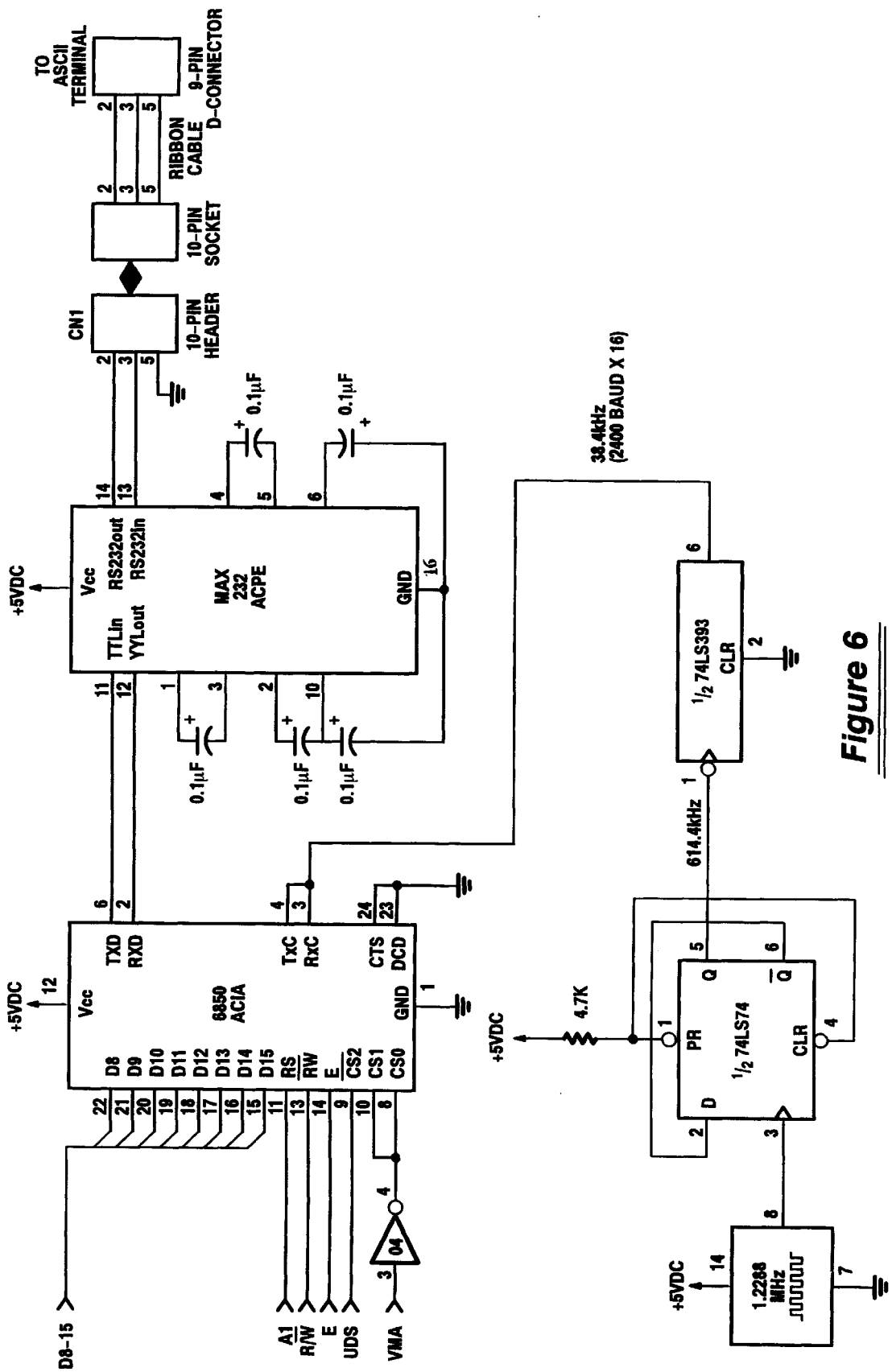
Figure 7:
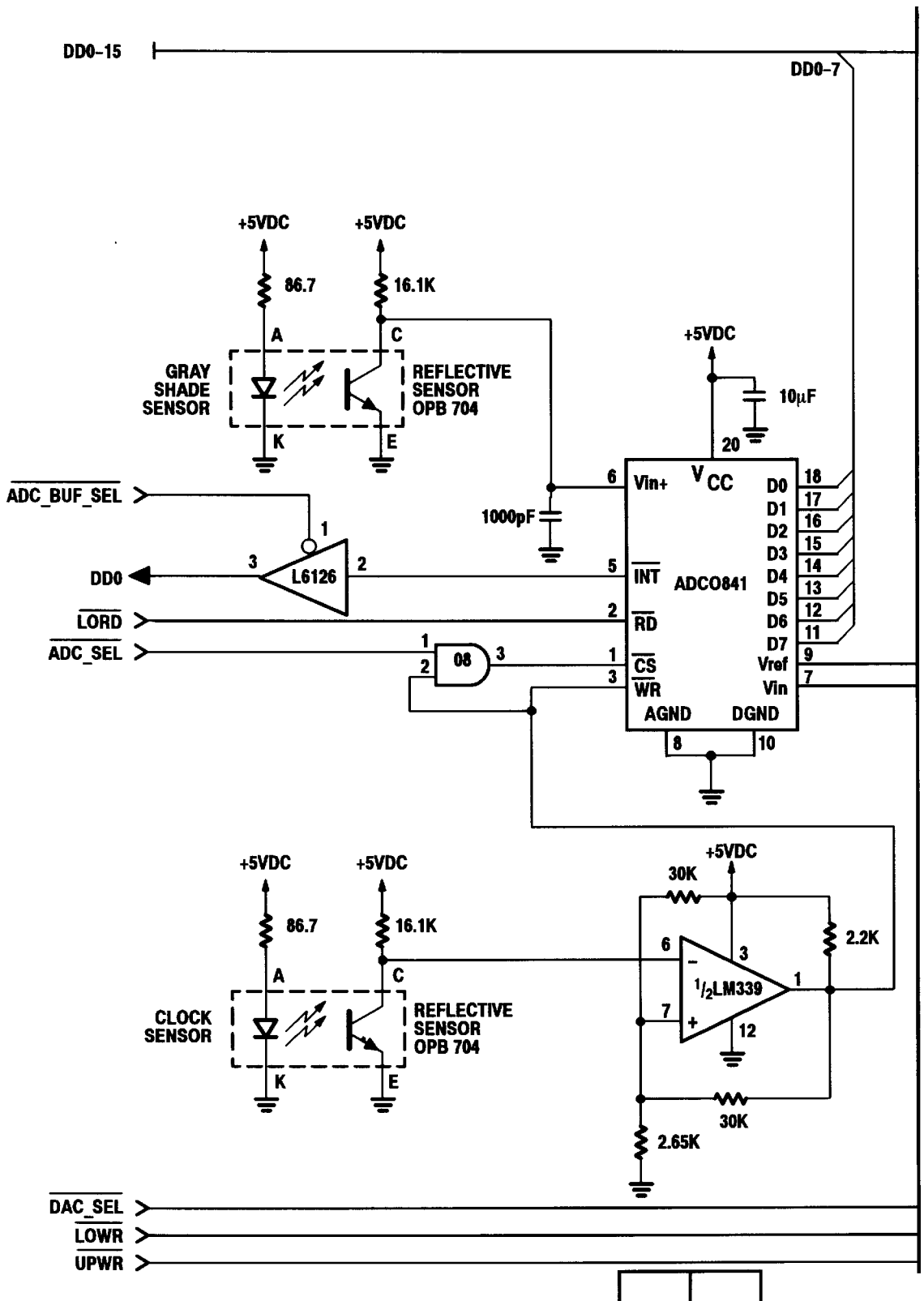
Figure 7:
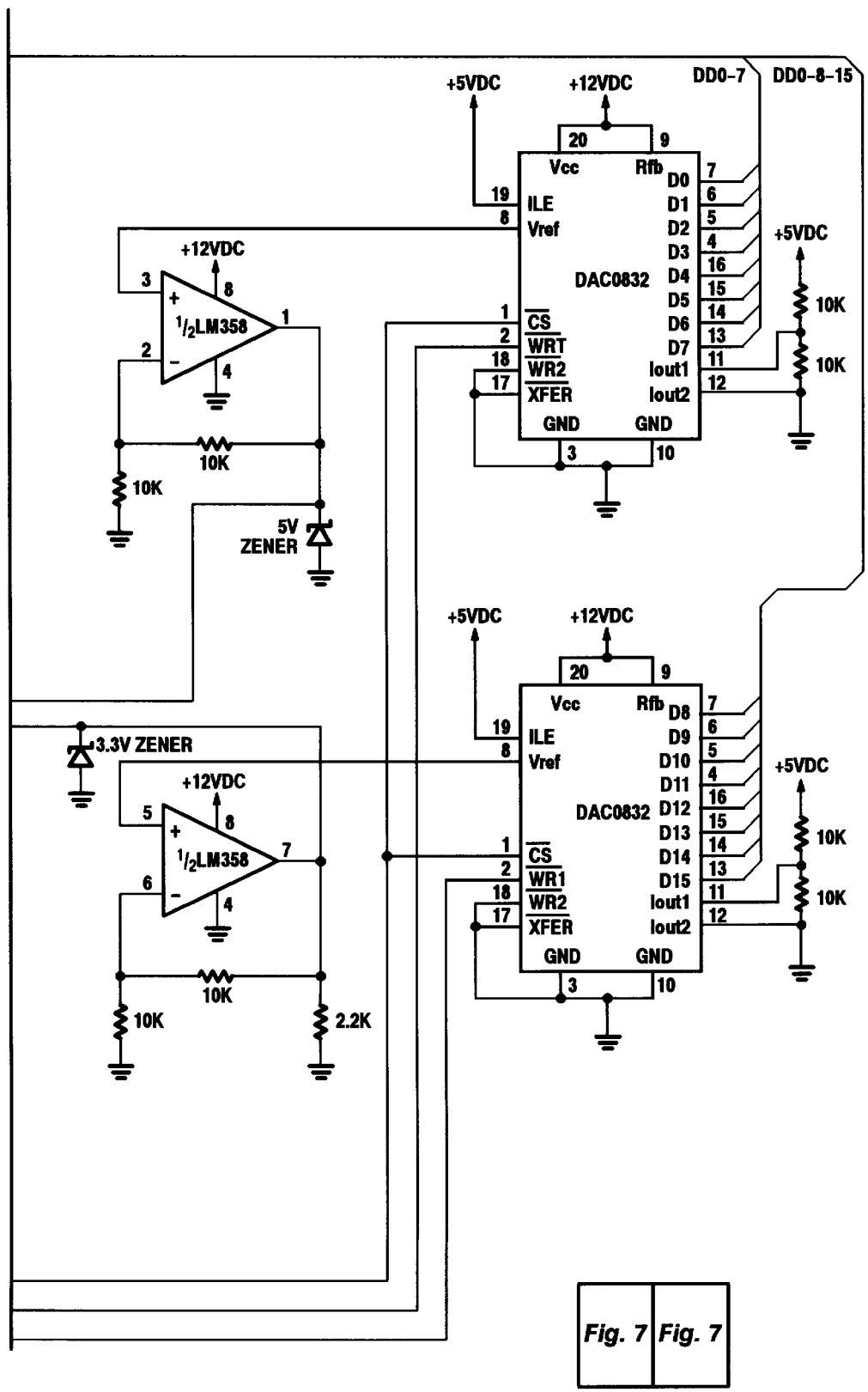
Figure 8:
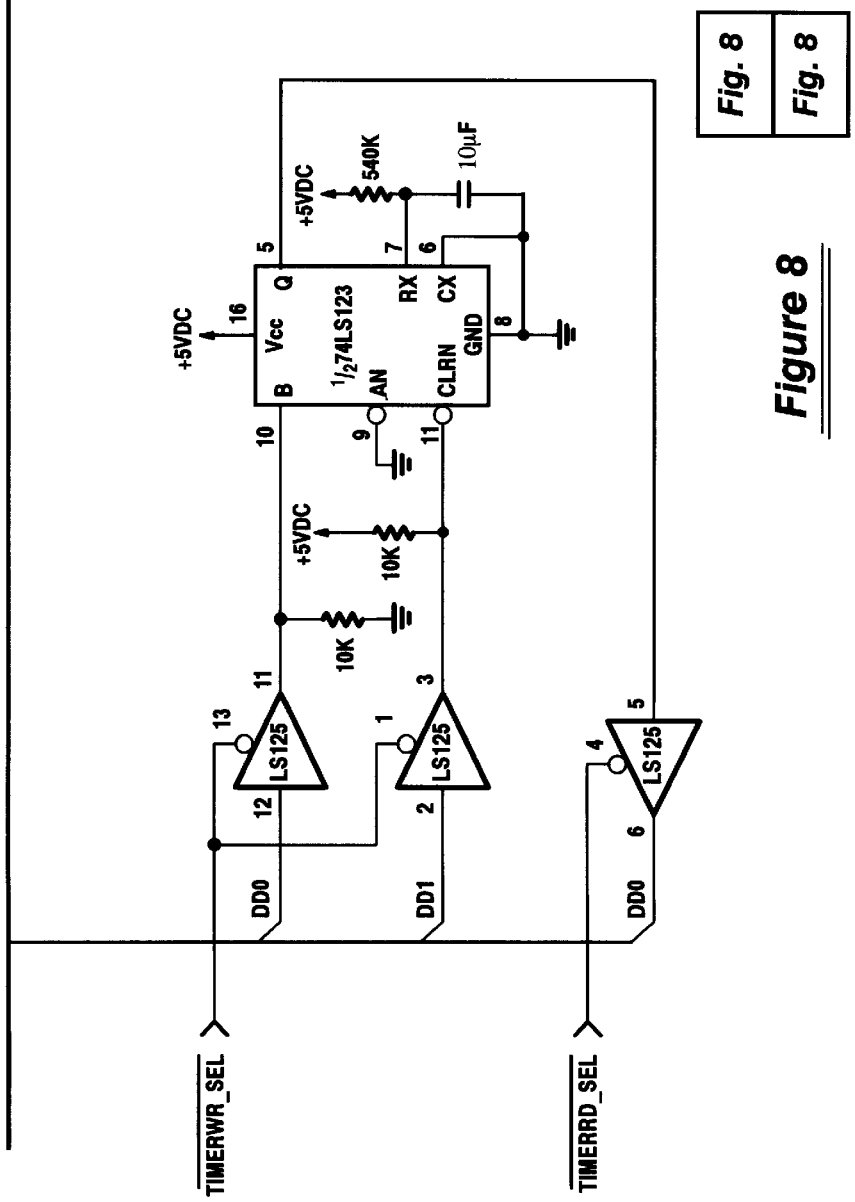
Figure 8:
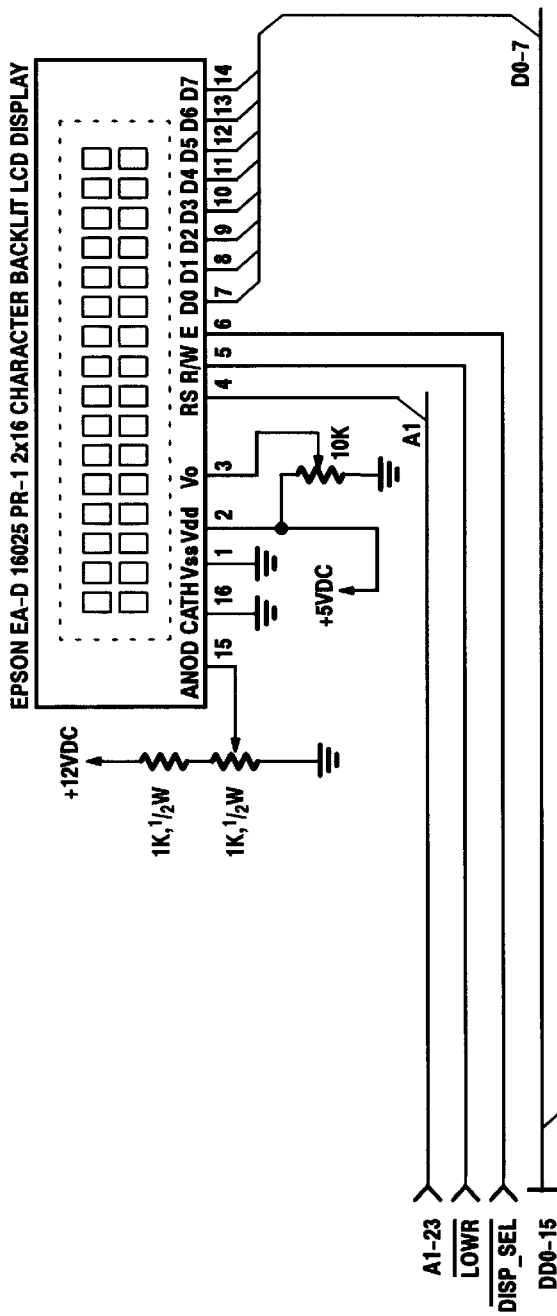
Figure 8:
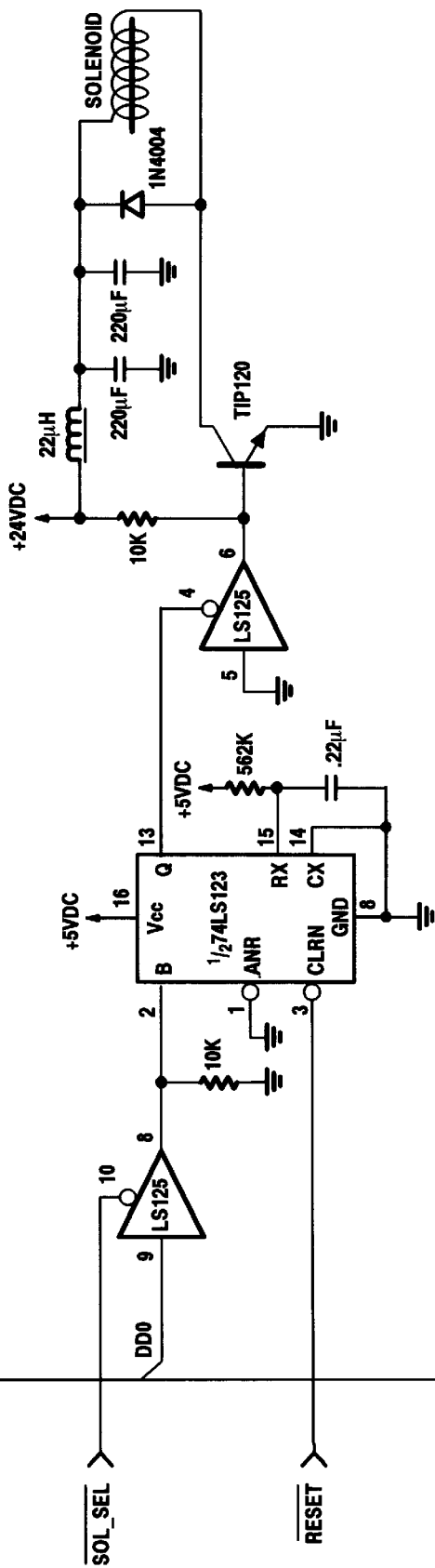
Figure 9:
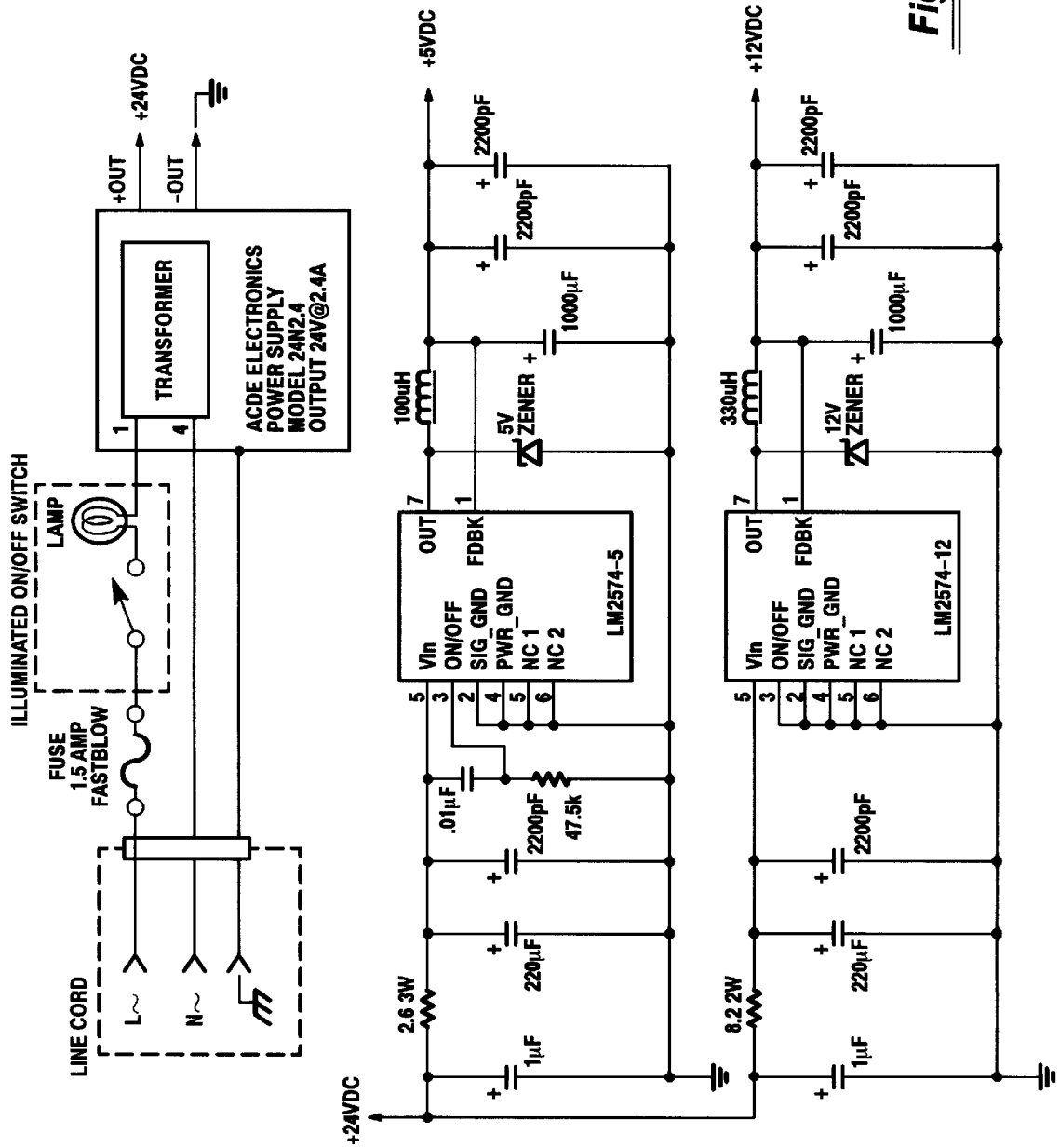

FIGS. A-1 through A-5 depict exemplary cards encoded with various gray-shade bits (simulated); while FIGS. B-1 through B-5 depict respective read-out therefrom;

FIG. 3 gives an exemplary code-field for such cards (gray shade areas);

FIGS. 4–9 give preferred schematic diagrams for a preferred related card reader system.

Figure 1:
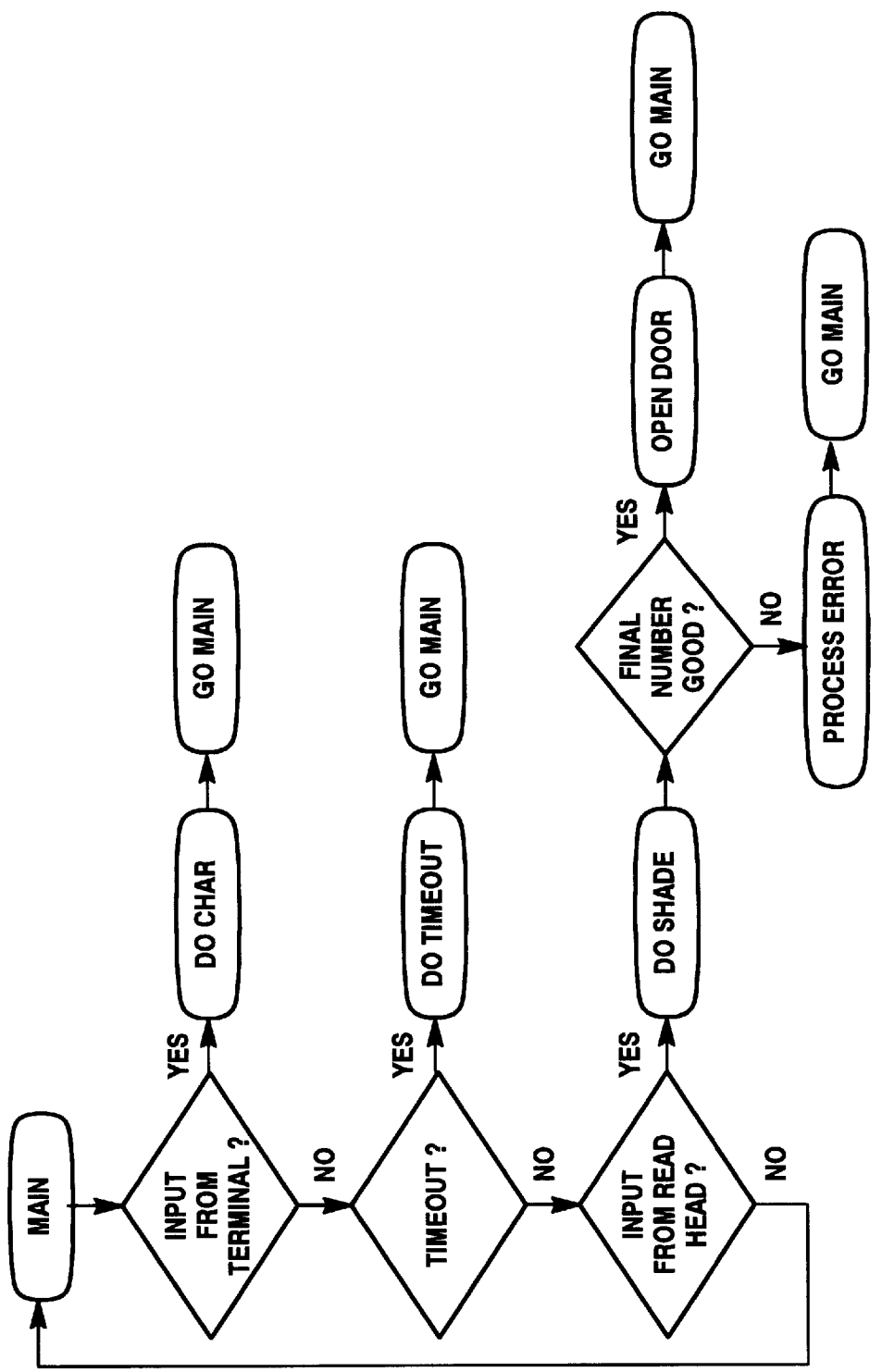
FIG. 1 gives a flow diagram showing operational sequence in our preferred system.

FIGS. 10–13 give preferred operational software flow for a related microcontroller, expanding on FIG. 1; and FIGS. 14, 15 tabulate items from FIGS. 4–9 with particular descriptions thereof.

DETAILS OF PREFERRED EMBODIMENTS

A "Gray Shade" Pass Card Reader is here taught that will scan a specially designed pass card PC (see FIG. 2) containing data bits, each stored as a bit-zone (cell) characterized by various shades of gray and printed on the surface of the card. Pass card PC is to be swiped through a read head (see FIG. 1A) containing optical sensors OS that reflect a beam of infra-red light off these bit-zones SA and back to a photo transistor PT (see FIG. 1A). As the beam of light passes over these gray-shaded zones SA (FIG. 2), the amount of light reflected and detected at PT corresponds to a certain "percent of shading". A 0% shade means zero shading and can be considered "white", while a 100% shade means complete shading and can be considered "black". The amount of shading detected can be converted to a code number between 0 and 255 by an 8-bit analog to digital converter (ADC, see FIG. 1A).

A microcontroller MC will continuously test the ADC to see if a number is ready to be processed. Each gray shade readout is shifted and then sequentially added to the other readouts. Once an entire card has been scanned, the combined code number CCN is compared to a list of valid values stored as a look-up table LUT in a memory M. This memory is battery backed up and is thus safe from corruption due to power failure. If a "valid" number is given on a pass card PC, the microcomputer M-C can cause a door to open providing access to a restricted area. Otherwise, all invalid codes are processed by various error handling routines.

The microcontroller MC also monitors a serial RS-232 communication port Cp (FIG. 1A) for input from a terminal.

Figure 1A:
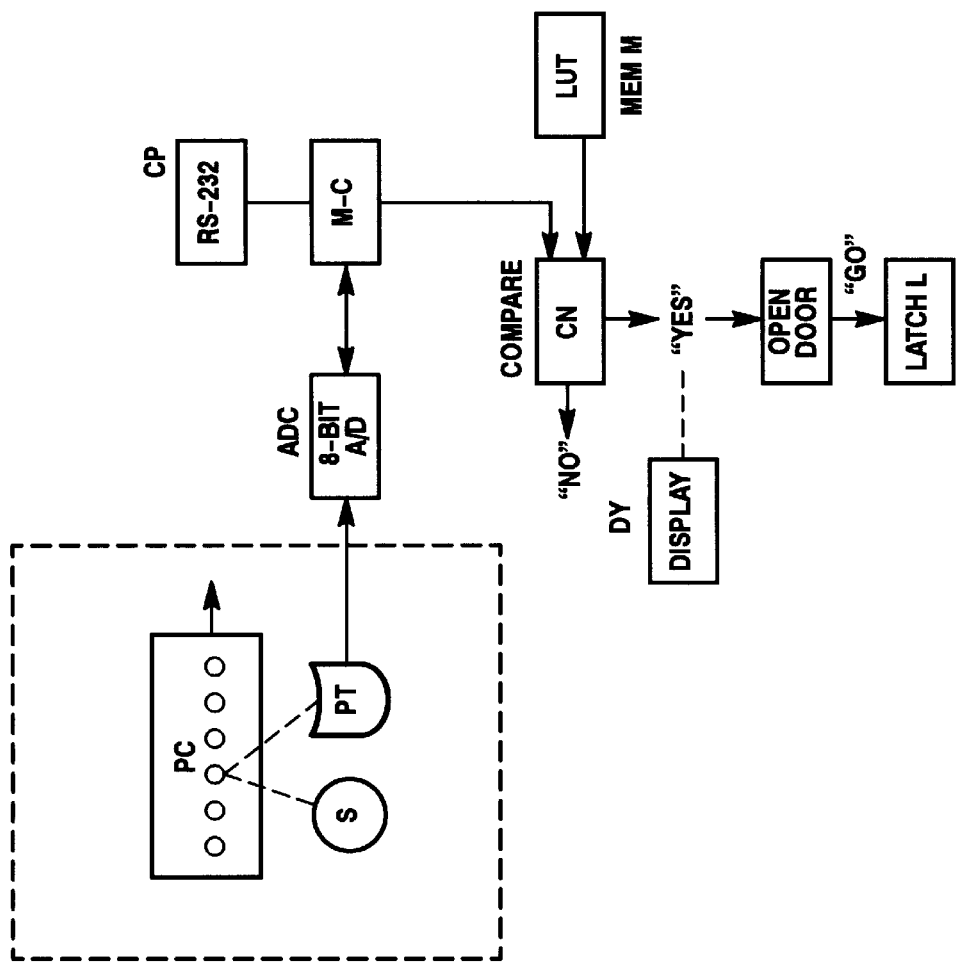
FIG. 1A is a related block diagram schematically indicating a preferred card reader system.

The flow chart in FIG. 1 gives a preferred sequence of steps for the foregoing.

a Specifications, Features and Characteristics (see FIG. 1A)

8-level gray shade optical reader OR, FIG. 1A, with automatic calibration

A Motorola 68010 microprocessor based microcontroller, MC

Battery backed up non-volatile RAM 2-line, 32 character LCD backlit display, Dy

Serial RS-232 communication port, Cp

Solenoid activated door latch, L (card PC can open)

110–120 VAC 60 Hz line voltage

A simple black and white bar-code would provide only 256 combinations, whereas this gray shade scheme can provide approximately 16.8 million combinations in the same space.

Design Details

Pass Card Design

Figure 2:
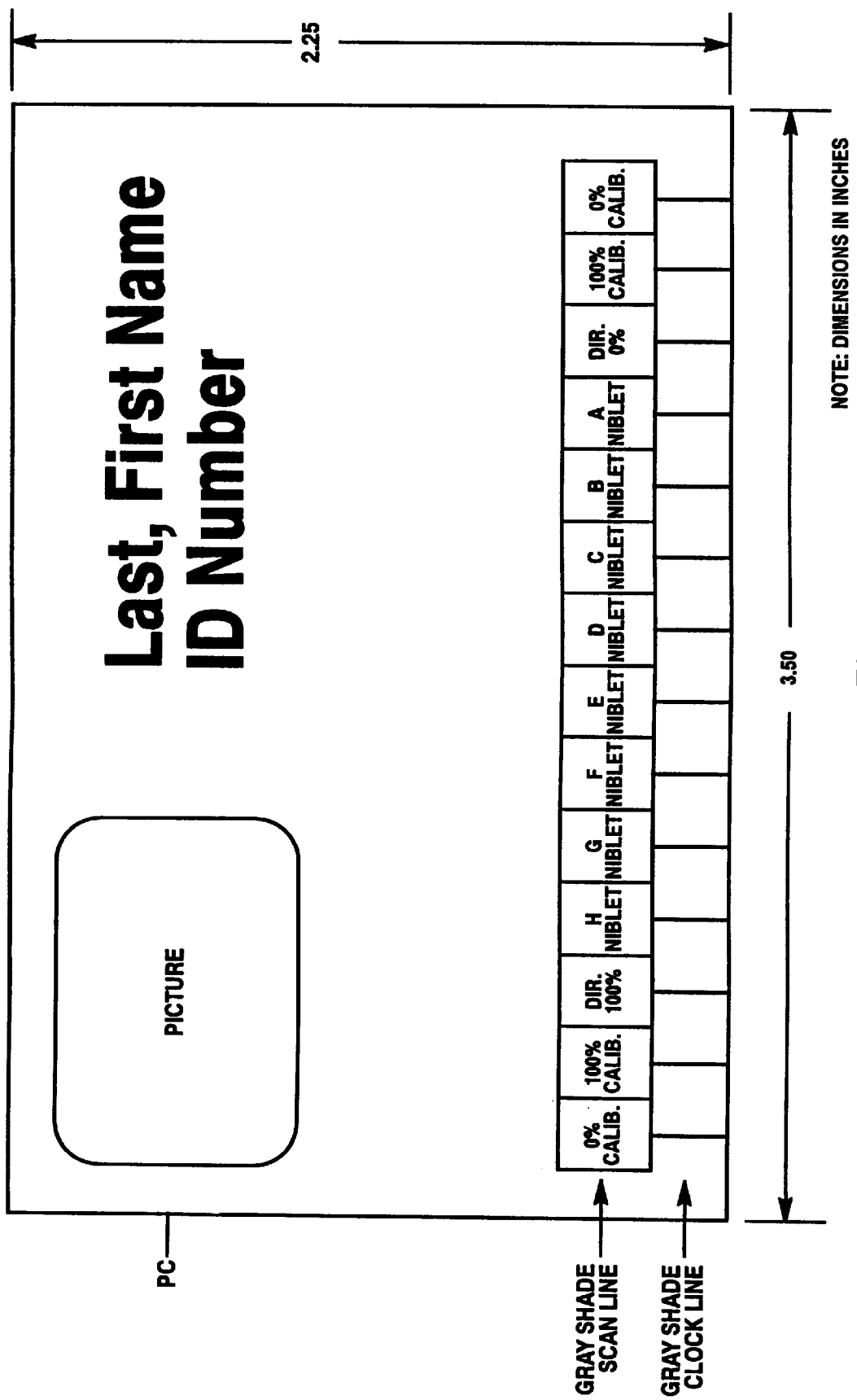
FIG. 2 depicts the preferred format and design of a related gray-shade encoded pass card.

A preferred format and design for a gray-shade Pass Card embodiment (see PC in FIG. 2) is as follows:

FIGS. A-1 to A-5 represent a selection of 8 different gray shades to be printed on a pass card PC (see bit-cells on scan-line S-L) i.e. FIGS. A-1 to A-5 show prototype pass cards with gray-shade-coded bit-cells and clock-lines C-L (as in FIG. 2). The printer used is capable of printing at a resolution of 1200 dpi, providing or a high-quality gray shade for the cells. The cards were designed using the drawing features of Microsoft Word for Windows, Ver 6.

The cards labeled DOT.1, DOT.2 and DOT.3 (FIGS. A-1, A-3, A-5) show the 24 different gray shades allowed from MS Word; while FIGS. B-1, -2, -3 represent actual scope traces showing the output of the read head (or FIG. 1A), as it scans the Gray Shade Scan Line (cells) and Clock Lines C-L for respective caards DOT.3, DOT.2, DOT.3. It can be seen that the outputs from so scanning the shade line corresponds to the amount of gray shade for each bit-cell on the card.

From these three readout examples, workers can see that the eight (8) unique gray shades selected provided good voltage separation between each shade (each cell). These 8 different shades are printed on the card labeled DOT2*a* (FIG. A-2, readout at FIG. B-4). Also, a test of the "worst case" condition was performed with the card labeled DOT2*b* (FIG. A-5, readout at B-5). This is when each niblet (cell) alternates between 0% and 100% gray shade. For this, the read head must be able to transition quickly enough before the next clock signal is scanned.

FIGS. B-4, B-5 show actual scope traces reflecting the output of the read head as it scans DOT2*a* and DOT2*b*.

The DOT2*a* trace (FIG. B-4) shows that there is a good separation between each of the outputs from the 8 shades selected.

The DOT2*b* trace (FIG. B-4) also shows that a given shade signal does settle in time to accommodate the next clock signal transitions.

Structure of Records in RAM Containing Valid Codes, Numbers and Names (see FIG.3)

The Structure begins at address $A000.

At $A000 store the number of records contained in RAM

Beginning at $A010 and every $10 thereafter until RAM is exhausted, store the indicated bits in FIG. 3 records.

The IDNUM field of each record is compared against the number scanned from a card (PC). If a match is found, then the name associated with the pass card is displayed on the front display panel (Dy FIG. 1A) and access to the restricted area is granted (latch L), provided that the access byte is set to a value other than 0. This access byte (A-b, FIG. 3) could also represent a level of access or (security) to provide to the pass card holder.

Schematic Drawings

Schematic circuit drawings for preferred versions of related electrical components for the foregoing are given as FIGS. 4–9, (see also FIGS. 14, 15).

Software Block Diagrams (FIGS. 10–13)

FIGS. 10–13 give flow diagrams for preferred software, running on a Motorola 68010 based microcontroller. These expand on the flow diagram of FIG. 1.

Figure 10:
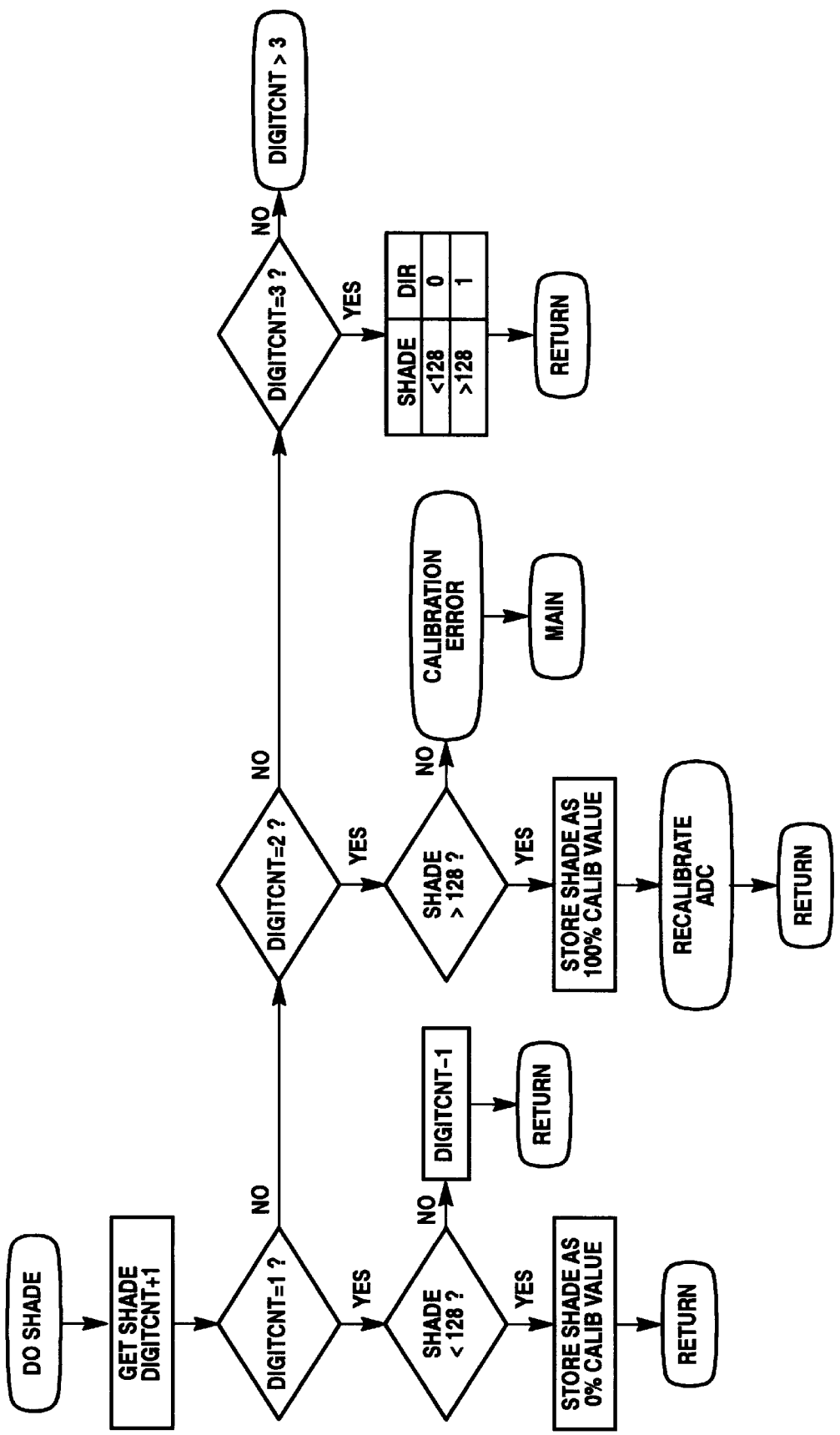
Figure 11:
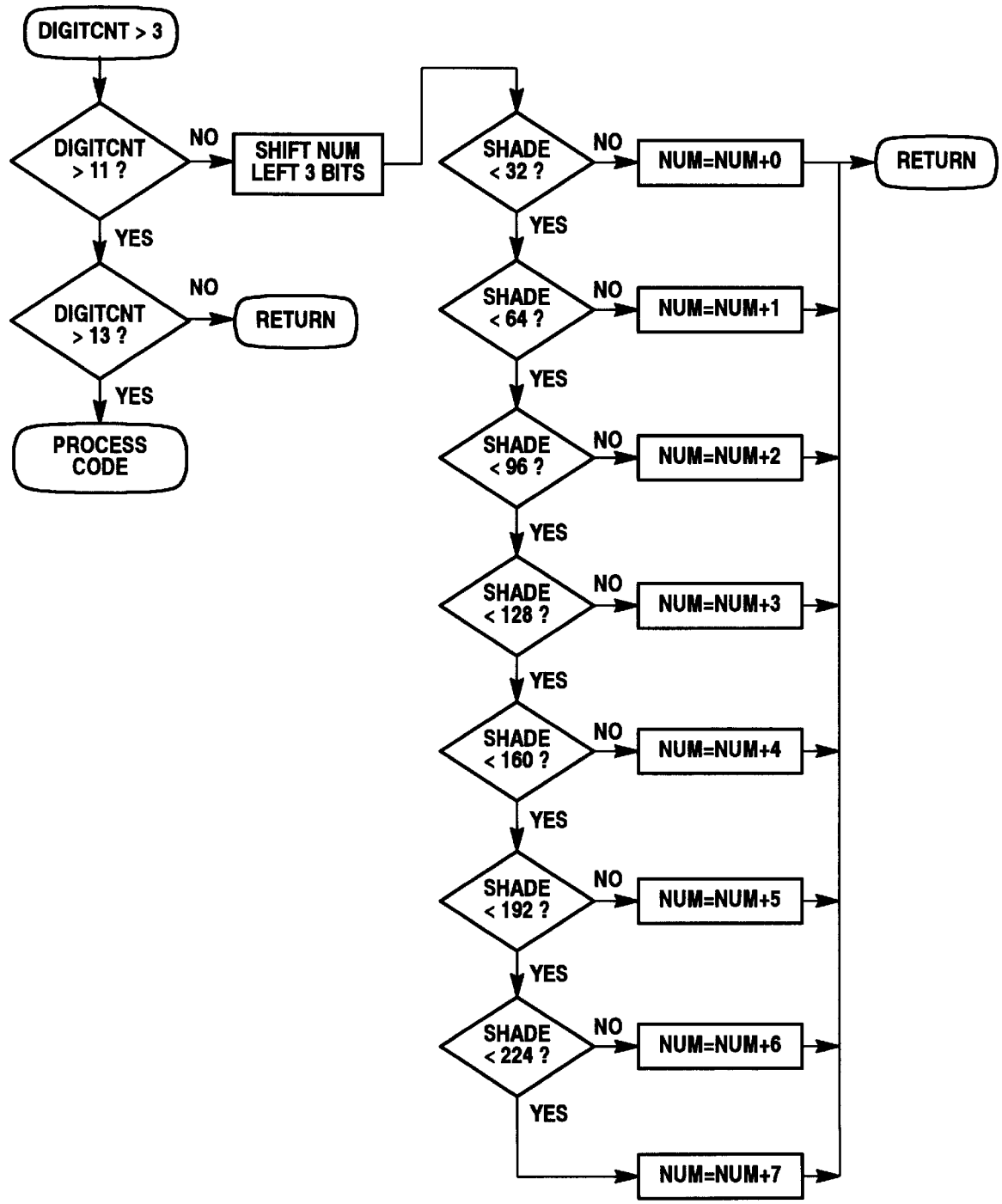
Figure 12:
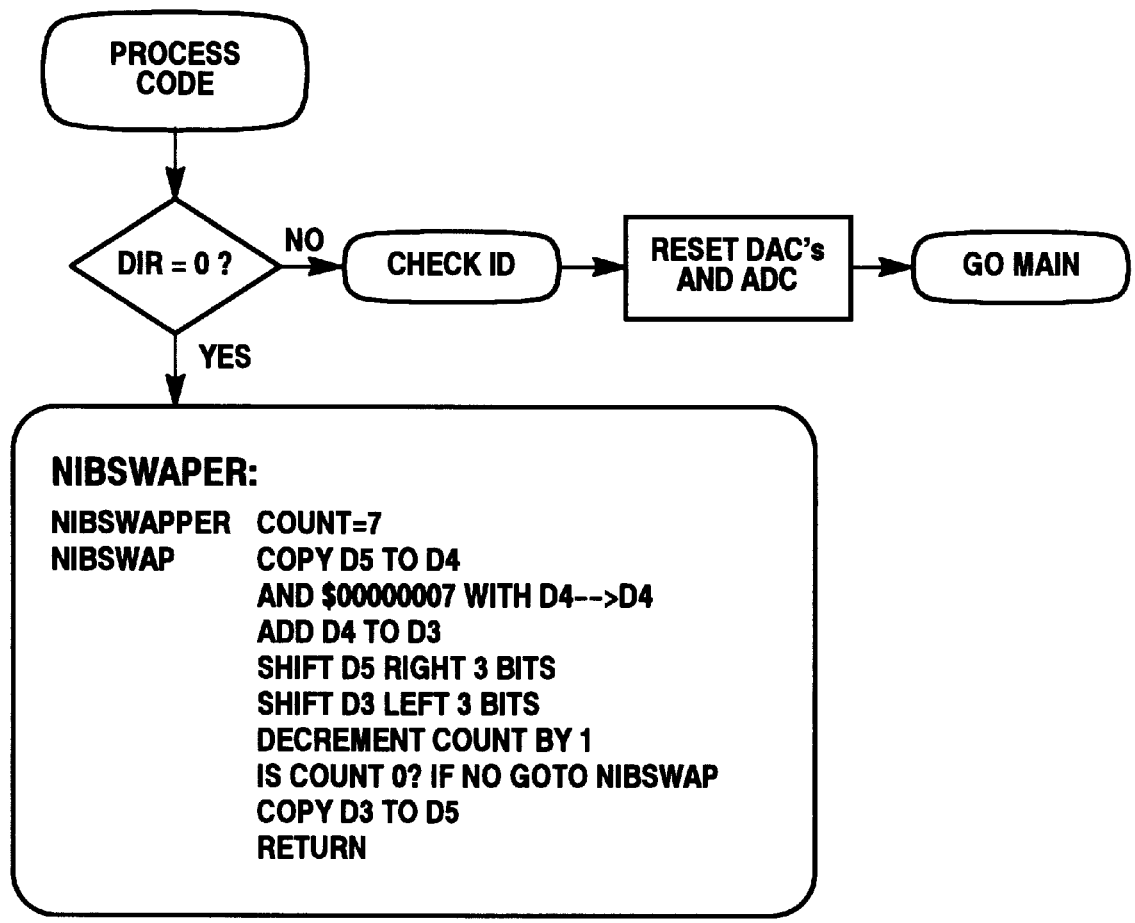
Figure 13:
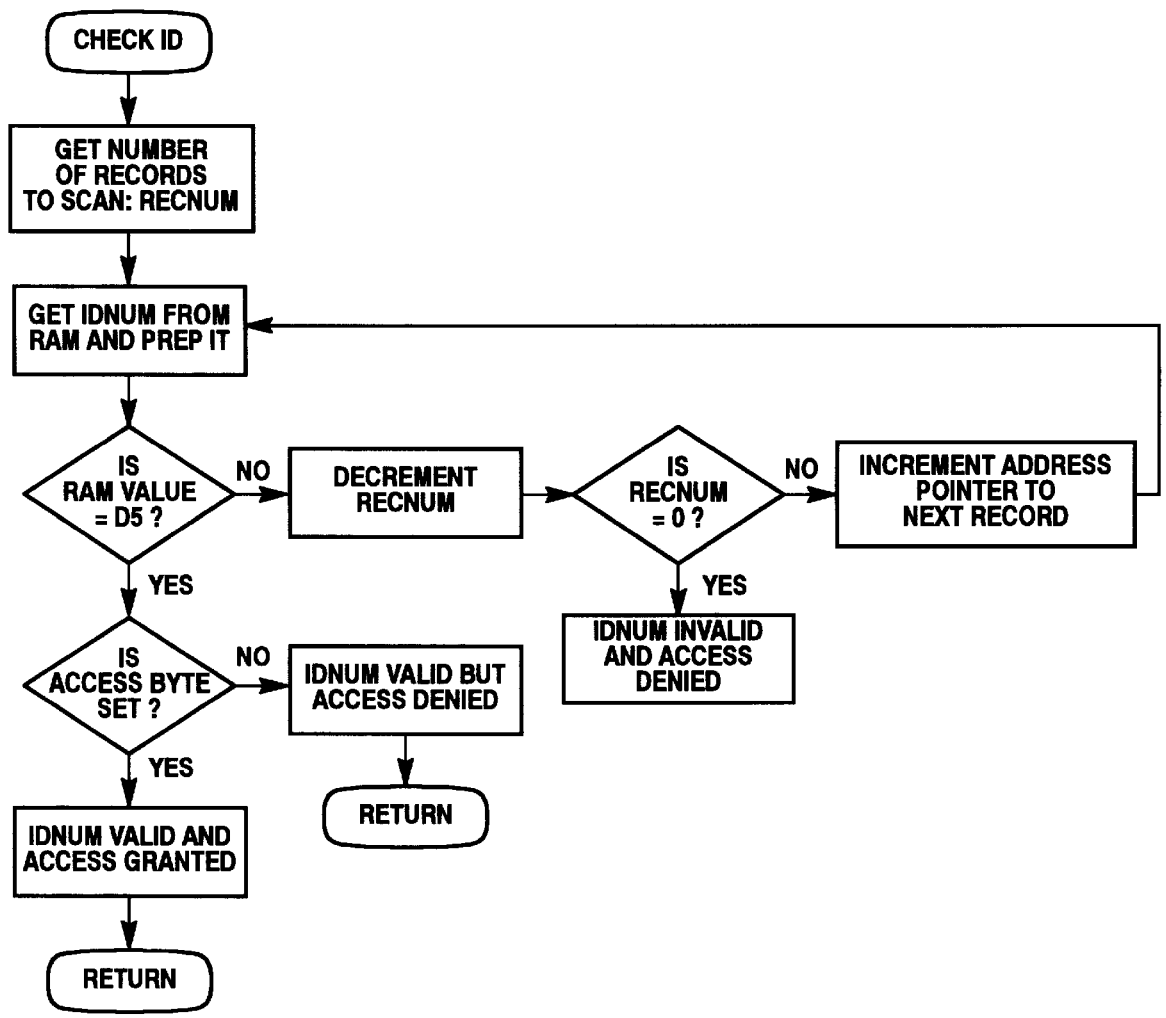

Note: FIG. 10 refers to FIG. 11, FIG. 11 refers to FIG. 12, and FIG. 12 refers to FIG. 13.

Note: FIGS. 14, 15 correlate and describe parts called-out in the schematics, of FIGS. 4–9; also a preferred manufacturer is specified in some cases.

Some Novel Features

A pass card using gray-shade "bits". (See PC in FIG. 2, with 8 shade preferences—selected from 24 shades allowed by MS Word")

with "auto calibrate" bits;

8 shades, 0 to 255, via 8-bit converter (ADC, FIG. 1A)

preferably with clock marks for each bit space or cell (see C-L, FIG. 2)

e.g., Reader checks ID-data base, and if a match is found, enables "entry" (see OR FIG. 1A)

preferably scans entire line, sums bit-numbers (—ID No.), check vs. mem. LUT (see FIGS. 1, 10–14 and schematics of FIGS. 4–9)

IR Reader: (e.g. see OR, FIG. 1A)

Preferably scans with light beam (IR) reflected from gray-shaded-bit cells onto phototransistor PT, which converts the amount of light (intensity, reflected by gray-shade) to a bit-number as encoded (see ADC, FIG. 1A).

Conclusion

It will be understood that the preferred embodiments described herein are only exemplary, and that the invention is capable of many modifications and variations in construction, arrangement and use without departing from the spirit of the invention.

Since modifications of the invention are possible, for example the means and methods disclosed herein are also applicable for other color shades (encoded), as well as to other card designs; and it will be understood that the present invention is also applicable for enhancing other related color-coded arrays of bit cells (e.g., on cards for entry access).

Examples given above of other possible variations of this invention are merely illustrative. Accordingly, the present invention is to be considered as including all possible modifications and variations within the scope of the invention as defined by and set forth in the appended claims.

What is claimed is:

1. A method for self-calibration of a card reader system, the method comprising the steps of:

reading a card with a card reader, said card including:
a plurality of color cells with each color cell representing encoded information,
a plurality of calibration cells capable of being used to calibrate said card reader to read said color cells, and
timing indicia for timing a reading of said calibration cells and said color cells by said card reader;

using said color cells and said timing indicia read to produce an output indicative of the color of said color cells;

using said calibration cells to provide a calibration output to a calibration circuit; and calibrating said card reader based on reading the calibration cells to modify said output indicative of the color of said color cells.

2. The method of self-calibration of claim 1, further comprising the step of deriving a direction of scanning of said card, and wherein the step of deriving includes reading at least one direction cell to determine the direction of scanning of said card.

3. The method of self-calibration of claim 1 wherein the step of reading a card includes reading a card having color cells that are shades of gray.

4. The method of self-calibration of claim 1 wherein the step of reading includes reading a card having a calibration cell corresponding to the color white.

5. The method of self-calibration of claim 1 wherein the step of reading includes reading a card having a calibration cell corresponding to the color black.

6. The method of self-calibration of claim 1 wherein the step of reading includes reading a card having respective calibration cells corresponding to the colors black and white.

7. The method of self-calibration of claim 1 wherein the step of reading includes reading a card having at least one color cell disposed between at least two calibration cells.

8. The method of self-calibration of claim 2 wherein the step of reading includes reading a card having at least one color cell disposed between at least two direction cells.

9. The method of self-calibration of claim 1 wherein the step of calibrating includes providing a signal representing a respective color of each of said calibration cells to an analog to digital converter to determine a lower and an upper conversion limit of said analog to digital converter.

10. The method of self-calibration of claim 9 wherein the step of calibrating includes providing a digital signal indicative of the respective color of said calibration cells to a digital to analog converter, said digital to analog converter providing an output to a voltage amplifier, the output of said voltage amplifier being provided as a voltage reference to said analog to digital converter to establish at least one of said upper or lower conversion limits.

11. The method of self-calibration of claim 10 wherein the step of calibrating includes receiving a signal indicative that one of said calibration cells is white, said voltage amplifier providing a voltage reference Vin- to said analog to digital converter to establish said lower conversion limit.

12. The method of self-calibration of claim 10 wherein the step of calibrating includes receiving a signal indicative that one of said calibration cells is black, said voltage amplifier providing a voltage reference Vref to said analog to digital converter to establish said upper conversion limit.

13. The method of self-calibration of claim 9 wherein the step of calibrating includes receiving a signal indicative that the color of one of said calibration cells is a first color and the color of another of said calibration cells is a second color, said analog to digital converter providing a digital signal indicative of said first color to a first digital to analog converter and a digital signal indicative of said second color to a second digital to analog converter, said first digital to analog converter providing an output to a first voltage amplifier which provides a voltage reference Vin- to said analog to digital converter to establish said lower conversion limit, said second digital to analog converter providing an output to a second voltage amplifier which provides a voltage reference Vref to said analog to digital converter to establish said upper conversion limit.

14. The method of self-calibration of claim 13 in which said first color is white.

15. The method of self-calibration of claim 13 in which said second color is black.

* * * * *